Oct. 16, 1962 H. L. OLSON 3,059,092
BEVERAGE BREWING DEVICE
Filed Dec. 4, 1959 2 Sheets-Sheet 1

*INVENTOR.*
HENRY L. OLSON
BY
*Caswell & Lagaard*
ATTORNEYS

Oct. 16, 1962  H. L. OLSON  3,059,092
BEVERAGE BREWING DEVICE
Filed Dec. 4, 1959  2 Sheets-Sheet 2
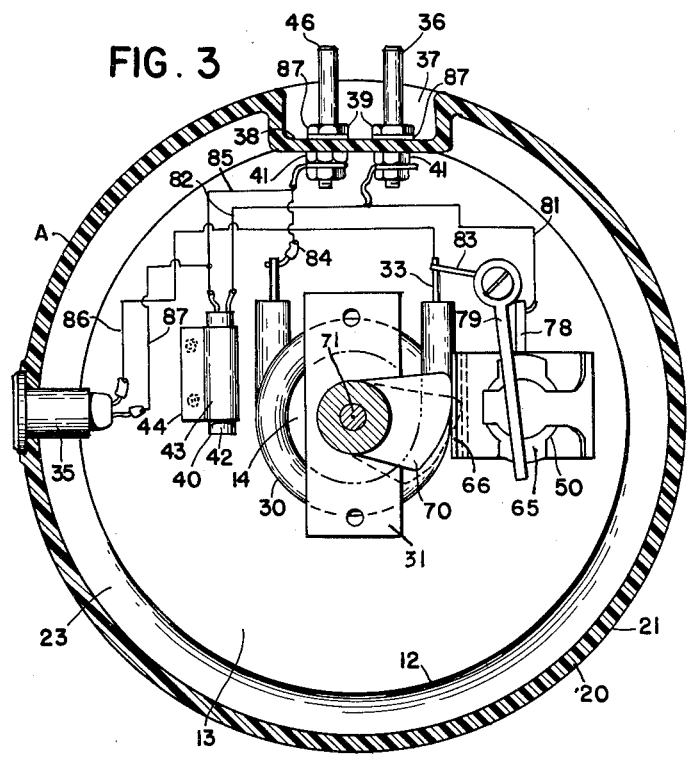
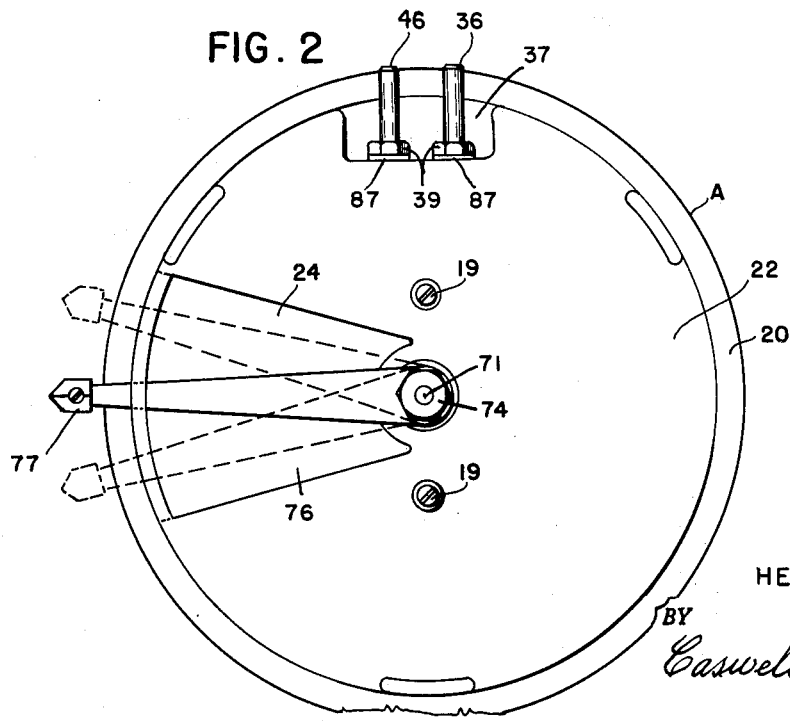
INVENTOR.
HENRY L. OLSON
BY
Caswell & Lagaard
ATTORNEYS United States Patent Office  3,059,092
Patented Oct. 16, 1962

3,059,092
BEVERAGE BREWING DEVICE
Henry L. Olson, Macon, Mo., assignor to McGraw-Edison Company, Elgin, Ill., a corporation of Delaware
Filed Dec. 4, 1959, Ser. No. 857,295
11 Claims. (Cl. 219—44)

The herein disclosed invention relates to beverage brewing devices and particularly to an electric coffee maker and has for an object to provide a device in which the brewing time may be readily manually adjusted.

Another object of the invention resides in providing a beverage brewing device with adjustable timing without the use of an adjustable thermostat.

An object of the invention resides in providing a beverage brewing device utilizing an over-center crowned wafer-type thermostatic switch.

Another object of the invention resides in utilizing a temperature controlled switch for the purpose, operating between fixed temperature limits.

A still further object of the invention resides in providing two heat conducting paths to the switch, one from a portion of the pot contacted by the beverage and the other directly from the heater.

Another object of the invention resides in utilizing for the second path a metal heat conductor and an air gap and in further providing adjusting means for varying the length of the air gap.

A feature of the invention resides in utilizing for the metal heat conductor a strip of flexible metal movable toward and from the heater to vary the length of the air gap therebetween.

Another object of the invention resides in providing a second heater for the pot energized continuously during use of the device for keeping the beverage hot after brewing has been completed and in providing a switch having a great enough differential so that the switch goes off at the end of the brewing period but does not go on unless the temperature drops below that produced by the second heater after the beverage has been brewed.

Other objects of the invention reside in the novel combination and arrangement of parts and in the details of construction hereinafter illustrated and/or described.

In the drawings:

FIG. 2 is a bottom view of the coffee maker.

FIG. 3 is an inverted sectional view of the housing and structure therein and taken on line 3—3 of FIG. 1.

Figure 1:
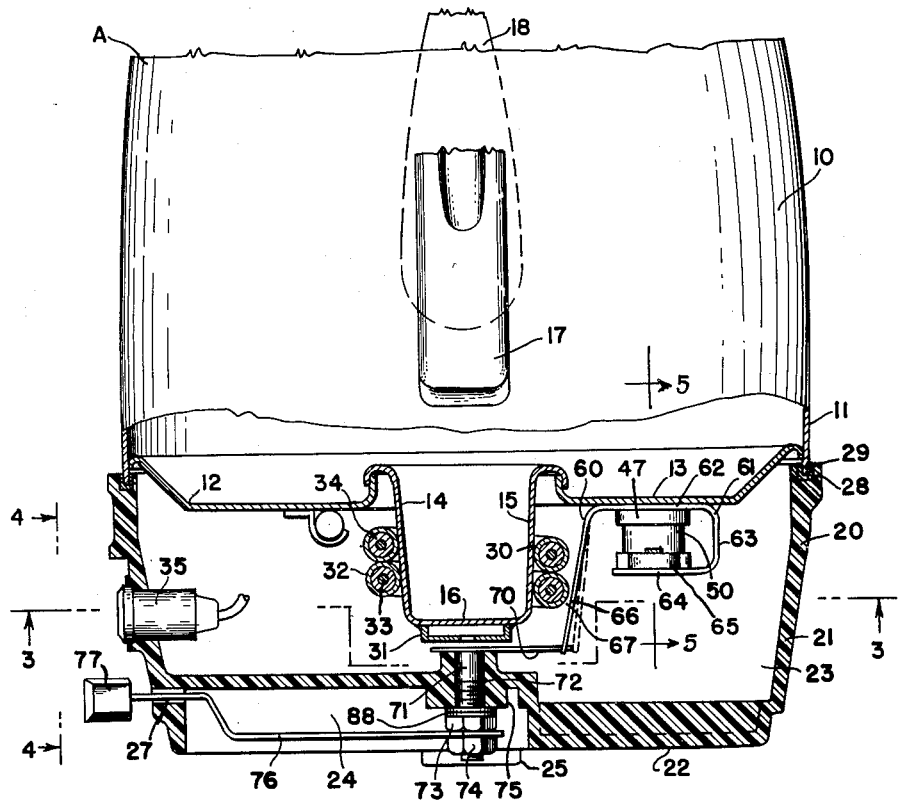
FIG. 1 is a fragmentary side elevational view, partly in section of a coffee maker illustrating an embodiment of the invention.
Figure 4:
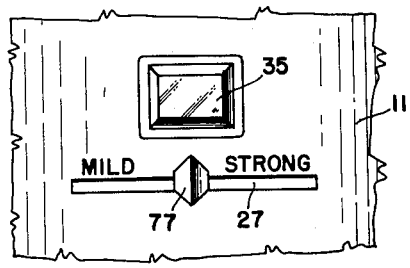
FIG. 4 is a fragmentary elevational view of a portion of the coffee maker viewed in the direction of lines 4—4 of FIG. 1.

For the purpose of illustrating the invention, a coffee maker has been shown which is designated in its entirety by the reference character A. This coffee maker comprises a coffee pot 10 having a circumferential wall structure 11 and a bottom 12 secured thereto. These parts may be brazed or secured together in any other suitable manner. The bottom 12 has a planiform portion 13 and is provided at its center with a depending well 14. The well 14 has a circumferential wall structure 15 and a bottom 16. The well 14 may be formed as a separate piece and brazed to the bottom 12 or the parts may be made integral if desired. The coffee pot further includes a handle 17, a spout 18, a percolator tube and valve, a coffee basket, a water distributor, and a cover not shown. These parts forming no particular feature of the invention have not been shown in detail in the drawings.

Attached to the lowermost portion of the coffee pot 10 is a housing 20 constructed of some insulating plastic material and which is formed with an annular wall 21 and a lower wall 22. This construction provides a chamber 23 within said housing and below the bottom 12 of the coffee pot proper 10. The lower wall 22 of the housing 20 is provided with a sector-shaped cavity 24 whose vertex lies approximately at the center of the lower wall 22. This cavity communicates with the exterior through an arcuate slot 27 in the annular wall 21 which is positioned somewhat above the lower edge of the lower wall 22. The wall structure 11 of the pot 10 extends below the locality of issuance of the bottom 12 therefrom and is received in an annular groove 28 in the wall 21. A gasket 29 forms a fluid tight connection therebetween. The housing 20 is held attached to the coffee pot 10 by means of two screws 19, FIG. 2, which extend through the lower wall 22 and which are screwed into a U-shaped crossbar 31, FIG. 1, welded to the bottom 16 of the well 14.

Encircling the well 14 is a coiled heater 30 which consists of a metal case 32 having a heating element 33 extending through the same. This heating element is spaced from the case 32 by means of insulating material 34. The case 32 is brazed to the circular wall structure 15 of the well 14 to make intimate contact therewith. The housing 20 also includes an electric light 35. For attachment of an electric cord to the beverage brewing device, two prongs 36 and 46 are employed which are mounted in a recess 37 in the annular wall 21 of housing 20. These prongs extend through an offset portion 38 of the wall 21 and are attached thereto by means of nuts 39 and 41.

In addition to the heater 30 an additional heater 40 is employed which is used principally to maintain the coffee pot hot after the brewing is completed. This heater consists of a tubular case 42 which is held in position against the planiform portion 13 of the bottom 12 by means of a clip 43. Clip 43 has a flange 44 projecting outwardly therefrom and which is spot welded to the planiform portion 13 of said bottom.

Figure 5:
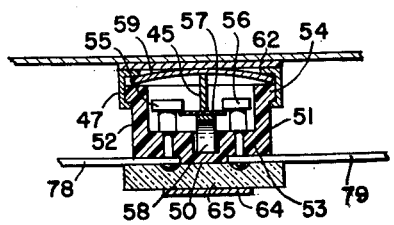
FIG. 5 is a longitudinal sectional view of the thermostatic switch drawn to an enlarged scale and taken on line 5—5 of FIG. 1.

For regulating the length of the brewing period, a thermostatic switch 50 is employed which is best shown in FIG. 5. This switch comprises a body 51 constructed of electrical insulating material and which is made with a cylindrical wall 52, an end wall 53 and which is open at the top. The wall 52 is constructed with an outwardly extending flange 54. Attached to the end wall 53 are two contacts 55 and 56 which are engageable by means of a shorting bar 57. This shorting bar is urged into engagement with said contacts by means of an arched leaf spring 58. Overlying the flange 54 is a crowned wafer-type thermostatic member 59 which at normal temperature is bowed outwardly as shown in FIG. 6. This member engages a finger 45 on the shorting bar 57 and when the temperature of the member 59 increases sufficiently the same snaps over center to a position in which it arches toward the end wall 53 of body 51. In such position, the said thermostatic member moves the shorting bar 57 through finger 45 out of engagement with the contacts 55 and 56 and opens the circuit connected thereto. The thermostatic member 59 is held in position on the end of the flange 54 by means of a metal retaining ring 47 which is rolled over the outer edge of said thermostatic member and under the shoulder formed by the flange 54.

Operating in conjunction with the switch 50 is a control device 60. This device comprises a resilient strip 61 of electrical conducting material such as phosphorous bronze or the like. This strip has a base portion 62 which is brazed to the planiform portion 13 of the bottom 12 of pot 10. This strip has a depending arm 63 which extends below the switch 50 and which has a finger 64 projecting outwardly therefrom and extending beneath said switch. An insulating block 65 is disposed between said finger and the end wall 53 of the switch 50 and urges the switch toward the bottom 12 with the ring 46 engaging the base portion 62 of the strip 61. By means of this construction, the switch is held in position where heat may be conducted to the thermostatic member 59 directly from the base portion 62 of strip 61 and indirectly from the heater 30 and the heater 40 through the bottom 12 and the said base portion 62. The strip 61 further includes a depending arm 66 which is bent so that the same may engage the case 32 of the heater 30 and conduct heat directly from said heater case to the switch 50. When the arm 66 is moved away from the said heater case the same still continues to conduct heat therefrom to the switch through an air gap 67 therebetween but in lesser amount. Thus the time required for the switch 50 to operate depends upon the amount of heat conducted to it from the beverage in the pot 11 at the bottom 13 and also from the heat passing from the heater case 32 to the arm 66 and to the switch through the base portion 62 of strip 61.

The position of the arm 66 with reference to the heater 30 may be adjusted by means of a cam 70 welded to the end of a shaft 71. Shaft 71 is journaled in a bearing 72 formed in the lower wall 22 of housing 20. Nuts 73 and 74 screwed on the threaded end 75 of shaft 71 clamp therebetween an adjusting lever 76 which projects through the slot 27 in the wall 21 of housing 20. A finger piece 77 secured to the end of said lever exteriorly of the housing serves to rotate the shaft 71 and to adjust the position of the cam 70 to hold the arm 66 at the proper distance away from the case 32 of heater 30.

The various parts of the invention are wired in the following manner and as diagrammatically shown in FIG. 3. The contact 55 of switch 50 has a terminal 78 connected to it while the contact 56 has a terminal 79 connected to it. Terminal 78 is connected by means of a conductor 81 to the prong 36 and similarly one side of the heating element of the heater 42 is connected by means of a conductor 82 to the same prong. The other terminal 79 of the switch is connected by means of a conductor 83 to one end of the heating element 33 of heater 30. The other end of said heating element is connected by means of a conductor 84 to the prong 46. Similarly the other end of the heating element of heater 42 is connected by means of a conductor 85 to the prong 46. Thus the heater 40 is directly connected to the prongs 36 and 46 at all times while the heater 30 is connected to said prongs only when the switch 50 is closed. The electric light 35 has connected to it two conductors 86 and 87 of which the conductor 87 is connected to conductor 85 and thus to prong 46 while the conductor 86 is connected to the conductor 83 which in turn is connected to the switch 50. It will thus be seen that the light 35 and the main heater 30 are connected in parallel and that the light indicates when the coffee is brewing.

The operation of the invention is as follows: The lever 76 is moved to the proper position to give the strength of coffee desired. The cord controlling the operation of the coffee maker is connected to the prongs 36 and 46 and plugged into a suitable electric light socket. Immediately heaters 30 and 40 are energized and the water in the coffee pot 10 is heated. As soon as the water in the well 14 is hot enough the coffee percolates and brewing takes place. At the same time heat is being conducted from the coffee in the pot through the planiform portion 13 of bottom 12 and to the base portion 62 of the control device 60 and from which it reaches the switch 50. Also heat at a higher temperature is being conducted from case 32 of heater 30 through the arm 66 of the strip 61, the air gap 67 and to said switch. When the heat from the two elements has reached a suitable temperature to operate switch 50 the same opens and terminates the brewing period. The thermostatic member 59 is so designed that it has a wide differential. In other words, the same is adjusted to open when the coffee has brewed the required length of time and does not close again until the temperature is below that produced by the auxiliary heater 40 alone. Thus the switch never closes again to renew brewing until after the coffee pot has been removed and cooled to a sufficient degree to cause the thermostatic member to move in the opposite direction. By adjusting the lever 76 the air gap 67 formed between the arm 66 and the case 32 of heater 30 can be varied to control the amount of heat flowing through said arm and to the switch and thus control the length of the brewing period.

In order to make is possible to completely submerge the coffee maker in dish water when washing the coffee pot, the gasket 29 is employed which makes a water tight seal between the end of the wall 11 of pot 10 and the upper portion of the wall 21 of housing 20. In addition, gaskets 88 in the form of washers are disposed between shaft 71 and bearing 72. Also gaskets 87 are mounted on the prongs 36 and 46 and between the nuts 39 and the offset portion 38 of housing 20. The light 35 may be cemented in position by waterproof adhesive or the same may be made water tight with reference to the housing 20 in any other desired manner.

The advantages of the invention are manifest. The invention is extremely simple in construction and is very positive in action. Adjustment is procured by shifting the position of the heat conductor and not by adjusting the thermostatic switch. A simple thermostatic switch of fixed setting can thus be employed and the adjustment procured without touching the switch. The switch is mounted in a manner so that the same may be easily and readily removed or replaced and all of the parts when the housing is removed are readily accessible. By constructing the parts as shown, the coffee maker may be completely submerged in water without shorting or permitting the entry of water into the chamber 23.

Changes in the specific form of the invention, as herein described, may be made within the scope of what is claimed without departing from the spirit of the invention.

Having described the invention, what is clamed as new and desired to be protected by Letters Patent is:

1. In a beverage brewing device having a pot formed with a bottom, an electric heater having a case contacting said bottom, said case having a heating element therein, and an electric heater circuit including said heating element and maintaining said case at a higher temperature than the bottom of said pot, the combination of a temperature controlled switch in said circuit having a heat sensitive surface receiving heat from the bottom of said pot, a heat conductor constructed of resilient sheet material and disposed adjacent the bottom of the pot in heat conducting relation with the heat sensitive surface of said switch and having a leg extending outwardly from the bottom of the pot and adjacent said heater, said leg being resiliently urged toward said heater, and manually controlled means engaging said leg and movable to move said leg away from said heater case.

2. In a beverage brewing device having a pot formed with a bottom, an electric heater having a case contacting said bottom, said case having a heating element therein, and an electric heater circuit including said heating element and maintaining said case at a higher temperature than the bottom of said pot, the combination of a temperature controlled switch in said circuit having a heat sensitive surface receiving heat from the bottom of said pot, a heat conductor constructed of resilient sheet material and disposed adjacent the bottom of the pot in heat conducting relation with the heat sensitive surface of said switch and having a leg extending outwardly from the bottom of the pot and adjacent said heater, said leg being movable toward and from said heater, resilient means urging said leg toward said heater, and a manually rotatable cam engaging said leg and serving to move said leg in the opposite direction.

3. In a beverage brewing device having a pot formed with a bottom, an electric heater having a case contacting said bottom, said case having a heating element therein and an electric heater circuit including said heating element and maintaining said case at a higher temperature than the bottom of said pot, the combination of a temperature controlled switch in said circuit having a heat sensitive surface receiving heat from the bottom of said pot, a heat conductor constructed of resilient sheet material and disposed adjacent the bottom of the pot in heat conducting relation with the heat sensitive surface of said switch and having a leg extending outwardly from the bottom of the pot and along said heater case, said leg being resiliently urged toward said heater case, a shaft having its axis substantially parallel with the axis of said pot and disposed below said bottom, a cam attached to said shaft and having an edge projecting beyond said heater and engaging said leg, said shaft on rotation moving said leg away from said heater.

4. In a beverage brewing device having a pot formed with a bottom, an electric heater having a case contacting said bottom, said case having a heating element therein, and an electric heater circuit including said heating element and maintaining said case at a higher temperature than the bottom of said pot, the combination of a temperature controlled switch in said circuit having a heat sensitive surface receiving heat from the bottom of said pot, a heat conductor constructed of resilient sheet material and disposed adjacent the bottom of the pot in heat conducting relation with the heat sensitive surface of said switch and having a leg extending outwardly from the bottom of the pot and along said heater case, said leg being resiliently urged toward said heater case, a housing disposed beneath the bottom of the pot and having a lower wall parallel with the bottom of the pot, said housing enclosing said heater, switch and heat conductor, a bearing in the lower wall of said housing extending through the same, a shaft extending through and journaled in said bearing, a cam on the inner end of said shaft and engaging said leg for determining the proximity of said leg to said heater and a finger piece on the outer end of said shaft.

5. In a beverage brewing device having a pot formed with a bottom, an electric heater having a case contacting said bottom, said case having a heating element therein, and an electric heater circuit including said heating element and maintaining said case at a higher temperature than the bottom of said pot, the combination of a temperature controlled switch in said circuit having a heat sensitive surface receiving heat from the bottom of said pot, a heat conductor constructed of resilient sheet material and disposed adjacent the bottom of the pot in heat conducting relation with the heat sensitive surface of said switch and having a leg extending outwardly from the bottom of the pot and along said heater case, said leg being resiliently urged toward said heater case, a housing disposed beneath the bottom of the pot and having a lower wall parallel with the bottom of the pot, said housing enclosing said heater, switch and heat conductor, a bearing in the lower wall of said housing extending through the same, the axis of said bearing being normal to said bottom, a shaft extending through and journaled in said bearing, a cam on the inner end of said shaft and engaging said leg for determining the proximity of said leg to said heater, said lower wall having a recess therein on the underside thereof and a finger piece disposed in said recess and attached to the outer end of said shaft.

6. In a beverage brewing device having a pot formed with a bottom, a depending well issuing from said bottom and having an annular wall, an electric heater having a case encircling and contacting said wall, said case having a heating element therein, and an electric heater circuit including said heating element and maintaining said case at a higher temperature than the bottom of said pot, the combination of a temperature controlled switch in said circuit having a heat sensitive surface receiving heat from the bottom of said pot, a heat conductor constructed of resilient sheet material and disposed adjacent the bottom of the pot in heat conducting relation with the heat sensitive surface of said switch and having a leg extending outwardly from the bottom of the pot and along said heater case, said leg being resiliently urged toward said heater case, a housing disposed beneath the bottom of the pot and having a lower wall parallel with the bottom of the pot, said housing enclosing said heater, switch and heat conductor, a bearing in the lower wall of said housing extending through the same, the axis of said bearing being normal to said bottom, a shaft extending through and journaled in said bearing, a cam on the inner end of said shaft and engaging said leg for determining the proximity of said leg to said heater, said lower wall having a recess therein on the underside thereof, a finger piece disposed in said recess and attached to the outer end of said shaft, said housing being constructed of plastic material, a water tight seal between said housing and pot and a water tight seal between said housing and shaft.

7. In a beverage brewing device having a pot formed with a bottom, an electric heater having a part contacting said bottom and in heat transfer relation relative thereto, said heater having a heating element for heating said part, an electric circuit including said heating element, the combination of a thermostatic switch in said circuit receiving heat from the bottom of the pot, a heat conductor disposed adjacent said heater in heat conducting relation with reference to said switch, said heat conductor having a part movable toward and from a portion of the heater at a temperature higher than that of the bottom and transferring additional heat to said switch, resilient means for moving said part in one direction and manually controlled means for moving said part in the opposite direction.

8. In a beverage brewing device having a pot formed with a wall structure for transferring heat to the beverage in said pot, an electric heater having a part contacting a portion of said wall structure and in heat transfer relation relative thereto, said heater having a heating element for heating said part, an electric circuit including said heating element, the combination of a thermostatic switch in said circuit receiving heat from the bottom of the pot, a heat conductor disposed adjacent said heater in heat conducting relation with reference to said switch, said heat conductor having a part movable toward and from a portion of the heater at a temperature higher than that of the bottom and transferring additional heat to said switch, resilient means for moving said part in one direction and manually controlled means for moving said part in the opposite direction.

9. In a beverage brewing device having a pot formed with a bottom, an electric heater having a case and a heating element therein and transferring heat to said bottom, and an electric heater circuit including said heating element, the combination of a temperature controlled switch in said circuit having a heat sensitive surface receiving heat from the bottom of said pot, heat conducting means between said case and said surface and including a conductor engaging said switch and an air gap between said case and conductor and also transferring heat to said switch and manually controlled means for varying the length of said air gap.

10. In a beverage brewing device having a pot formed with a bottom, a well depending therefrom, an electric heater having a helical case encircling said well and in heat conducting relation relative thereto, a heating element therein, and an electric heater circuit including said heating element, the combination of a thermostatic switch in said circuit underlying said bottom and having a surface receiving heat therefrom, said switch being spaced from said electric heater, a heat conductor having a portion transferring heat to said surface of the heater and a leg depending from said portion of the conductor and extending along the convolutions of said helical case and spaced therefrom, said leg being movable toward and from the case to adjust the spacing therebetween and manually controlled means engageable with said leg and maintaining said leg in any of its adjusted positions.

11. In a beverage brewing device having a pot formed with a bottom, a well depending therefrom, an electric heater having a helical case encircling said well and in heat conducting relation relative thereto, a heating element therein, an electric heater circuit including said heating element, the combination of a thermostatic switch in said circuit underlying said bottom and having a surface receiving heat therefrom, said switch being spaced from said electric heater, an elongated strip of metal having a base portion at said bottom conducting heat to said surface of said switch and a leg depending from said base portion and extending along the convolutions of said helical case and spaced therefrom, said leg being movable in a radial direction toward and from the case to adjust the spacing therebetween and manually controlled means engageable with said leg and maintaining said leg in any of its adjusted positions.

References Cited in the file of this patent
UNITED STATES PATENTS

| | | |
|---|---|---|
| 1,201,469 | James | Oct. 17, 1916 |
| 1,916,498 | Spencer | July 4, 1933 |
| 2,657,300 | Sullivan | Oct. 27, 1953 |
| 2,696,159 | Marquis | Dec. 7, 1954 |
| 2,817,743 | Foster | Dec. 24, 1957 |